United States Patent
Iwamoto et al.

(10) Patent No.: US 6,576,373 B1
(45) Date of Patent: Jun. 10, 2003

(54) NON-AQUEOUS ELECTROCHEMICAL APPARATUS AND ELECTROLYTE THEREOF

(75) Inventors: Kazuya Iwamoto, Sakai (JP); Atsushi Ueda, Osaka (JP); Masaki Deguchi, Neyagawa (JP); Masatoshi Nagayama, Katano (JP); Hiroshi Nishiyama, Moriguchi (JP); Hiroshi Yoshizawa, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 87 days.

(21) Appl. No.: 09/752,439

(22) Filed: Jan. 3, 2001

(30) Foreign Application Priority Data

Jan. 26, 2000 (JP) .......................... 2000-016738

(51) Int. Cl.⁷ ............................... H01M 6/04
(52) U.S. Cl. ..................... 429/347; 429/342; 429/332; 429/247
(58) Field of Search ................. 429/342, 332, 429/247, 347

(56) References Cited

U.S. PATENT DOCUMENTS 5,695,887 A    12/1997    Amatucci et al. ............. 429/48

FOREIGN PATENT DOCUMENTS

JP    2000-306779    * 11/2000

OTHER PUBLICATIONS

Bohnstedt et al. "Antimony Poisoning in Lead–Acid Batteries" Journal of Power Sources, 19 (1987), pp. 301–314.*

Patent Abstracts of Japan; vol. 2000, No. 09, Oct. 13, 2000; JP 2000 156245 A (Japan Storage Battery Co. Ltd.), Jun. 6, 2000.

Patent Abstracts of Japan; vol. 007, No. 162(E–187); Jul. 15, 1983 & JP 58068878 A (Hitachi Maxell KK), Apr. 23, 1983.

Patent Abstracts of Japan; vol. 1997, No. 09, Sep. 30, 1997 & JP 09129510 A (Sanyo Electric Co. Ltd. San Denshi Kogyo KK), May 16, 1997.

* cited by examiner

Primary Examiner—Laura Weiner
(74) Attorney, Agent, or Firm—Stevens, Davis, Miller & Mosher, LLP

(57)    ABSTRACT

A salicyl derivative or a salicylidene derivative such as salicyl alcohol or salicylaldehyde is added to a non-aqueous electrolyte to prevent evolution of gas caused by decomposition of the solvent.

9 Claims, 1 Drawing Sheet

NON-AQUEOUS ELECTROCHEMICAL APPARATUS AND ELECTROLYTE THEREOF

BACKGROUND OF THE INVENTION

1. Field of the Invention

The present invention relates to an electrolyte for non-aqueous electrolyte electrochemical apparatus and a non-aqueous electrolyte electrochemical apparatus using the electrolyte. More particularly, it relates to a non-aqueous electrolyte secondary battery.

2. Description of Related Art

Non-aqueous electrolyte electrochemical apparatuses using light metals such as lithium and sodium as negative electrode active materials are used in a wide variety of the fields such as of various electric and electronic equipment. Non-aqueous electrolyte electrochemical apparatuses include batteries, capacitors for electric double layers, and the like. Especially, non-aqueous electrolyte secondary batteries are being intensively investigated and developed at present because they are rechargeable batteries which have high energy density and can be miniaturized and weight-saved.

Solvents for electrolytes used in the non-aqueous electrolyte secondary batteries include, for example, cyclic carbonate esters such as propylene carbonate and ethylene carbonate, chain carbonate esters such as diethyl carbonate and dimethyl carbonate, γ-butyrolactone, γ-valerolactone, and the like.

As materials for negative electrodes, carbon materials such as graphite are used. Negative electrodes evolve heat or gas due to the reaction of an alkali metal ion contained in the materials with an electrolyte at a high temperature. Furthermore, since the non-aqueous electrolyte secondary batteries show high voltage and high energy density, oxidative decomposition of solvent or solute may occur also on positive electrodes. These phenomena are conspicuous with increase of temperature, and reductive decomposition occurs on the negative electrode side and oxidative decomposition occurs on the positive electrode side during storage at high temperatures such as 60° C. and 85° C. to evolve a large amount of gas. Recently, these non-aqueous electrolyte secondary batteries are widely used also as electric sources for backup of notebook type personal computers. The notebook type personal computers always have an internal temperature of 45° C. to 60° C., and a constant voltage of 4.2 V is always applied for keeping a high capacity at the above high temperatures, which readily causes evolution of gas.

If a gas is evolved at high temperatures of batteries, the safety device is driven owing to rising of the internal pressure of the batteries, resulting in cut-off of current or deterioration of battery characteristics, and, thus, improvement has been strongly demanded.

BRIEF SUMMARY OF THE INVENTION

In an attempt to solve the above problems, it has been proposed to use electrolytes containing additives which produce films on positive electrodes or negative electrodes. However, though these additives have the effect to inhibit evolution of gas, many of them form films of high resistance on the electrodes, and hence there are problems of causing deterioration of charging and discharging characteristics of batteries, particularly, characteristics of high rate discharging or low-temperature discharging.

Furthermore, when a mixed solvent of a cyclic carbonate ester such as ethylene carbonate and a chain carbonate ester such as dimethyl carbonate or methylethyl carbonate is used as a non-aqueous electrolyte, an ester interchange reaction due to the chain carbonate ester takes place on the electrodes, and alkoxide radicals such as methoxy group and ethoxy group are produced as intermediates.

Occurrence of the ester interchange reaction of unsymmetrical chain carbonate esters such as ethylmethyl carbonate can be readily confirmed by analysis while symmetrical chain carbonate esters such as dimethyl carbonate shows no changes in structure and hence occurrence of the ester interchange reaction can hardly be confirmed even by analysis. However, it is considered that ester interchange reaction also takes place in these symmetrical chain carbonate esters. The radicals produced by the ester interchange reaction are strong nucleophilic reagents and accelerate ring-opening and decomposition of ethylene carbonate to cause evolution of gas. Alternatively, they dissolve metals in the positive electrode active materials and break the crystal structure to deteriorate the characteristics. The dissolution of positive electrode active material is a serious problem in spinel type lithium manganate.

Moreover, ethylene carbonate which is widely used at present has a high melting point and, hence, has a problem that charge and discharge characteristics at low temperatures are markedly deteriorated when batteries are operated at low temperatures.

The present invention relates to a non-aqueous electrolyte electrochemical apparatus having at least two electrodes, a non-aqueous electrolyte prepared by dissolving a solute in a non-aqueous solvent and a separator interposed between the two electrodes, wherein the non-aqueous electrolyte contains at least a salicyl derivative represented by the formula (1) or a salicylidene derivative represented by the formula (2).

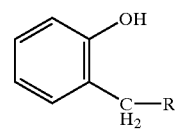
(1)

wherein R represents $C_nH_{2n}OH$ (n is an integer of 0–4) or $NR_1R_2$ ($R_1$ and $R_2$ are independently hydrogen or a substituted or unsubstituted alkyl group).

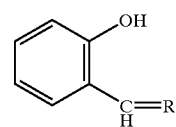
(2)

(wherein R represents oxygen, N—X (X is hydrogen, a hydroxyl group or a substituted or unsubstituted phenyl group) or CHCOR' (R' is a substituted or unsubstituted alkyl group)).

The salicyl derivative and the salicylidene derivative form a stable and low resistant organic film on positive electrodes and thus the non-aqueous electrolyte and the electrode does not directly contact with each other, and, as a result, gas evolution at the time of charging and storage at high temperatures and deterioration of the characteristics caused by dissolution of metals in the active materials, especially, materials of positive electrodes are inhibited. By using such a non-aqueous electrolyte, there is provided a novel non-aqueous electrolyte secondary battery which can be used in a wide temperature range, has a high energy density, is less in reduction of discharge capacity due to the repeated use of the battery, and is excellent in high rate charge and discharge characteristics.

DETAILED DESCRIPTION OF THE INVENTION

Figure 1:
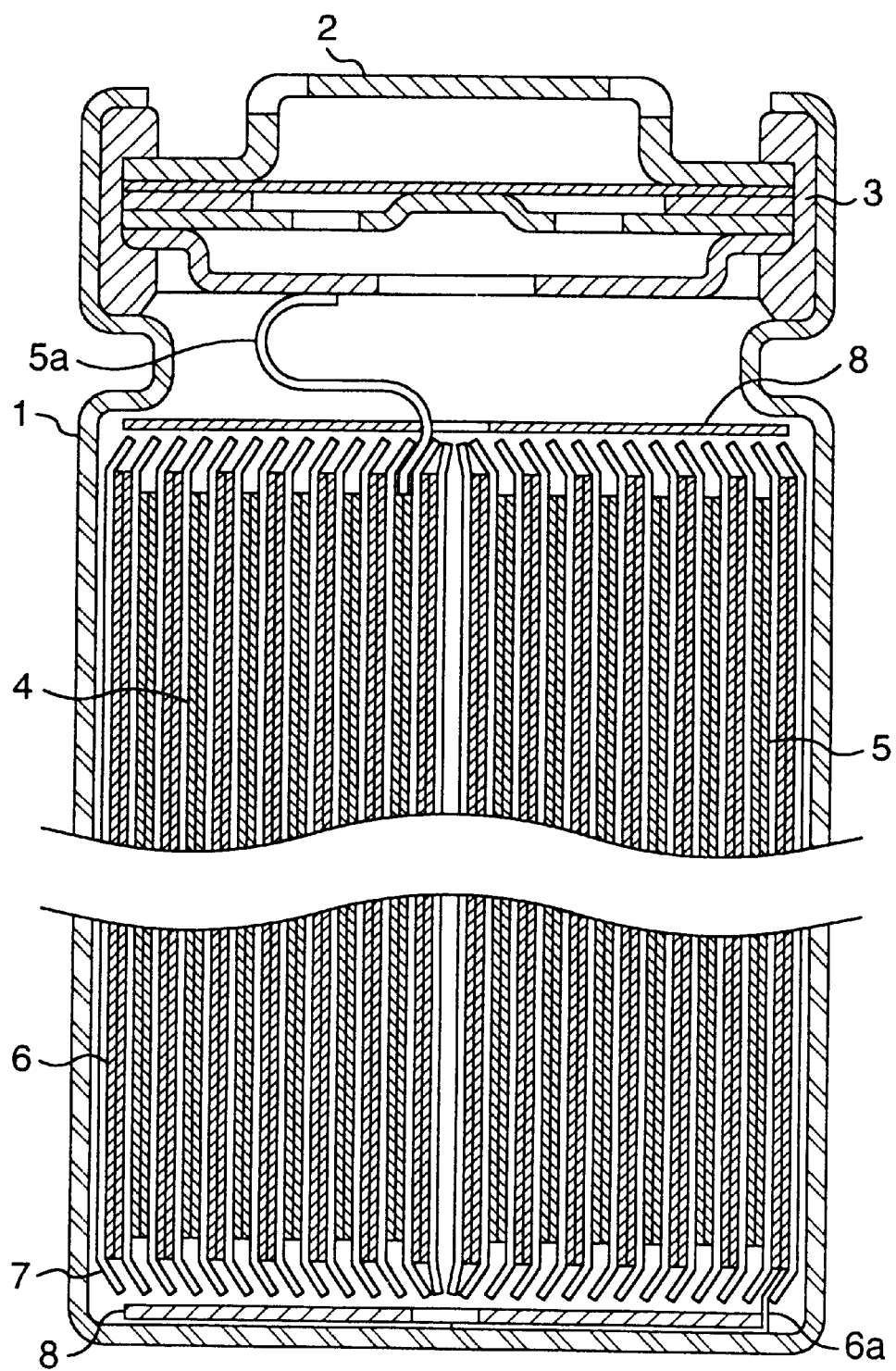
FIG. 1 is a longitudinal sectional view of a cylindrical battery according to one embodiment of the present invention.

The electrolyte for non-aqueous electro-chemical apparatuses according to the present invention comprises a solvent containing at least a salicyl derivative represented by the following formula (1) or a salicylidene derivative represented by the following formula (2) and a solute (for example, a lithium salt) capable of being dissolved in the solvent.

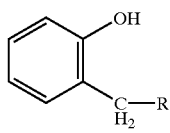

(1)

(wherein R represents $C_nH_{2n}OH$ (n is an integer of 0–4) or $NR_1R_2$ ($R_1$ and $R_2$ are independently hydrogen or a substituted or unsubstituted alkyl group).

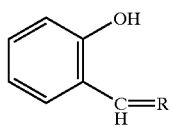

(2)

wherein R represents oxygen, N—X (X is hydrogen, a hydroxyl group or a substituted or unsubstituted phenyl group) or CHCOR' (R' is a substituted or unsubstituted alkyl group)).

In the above formula (1), as the substituents in the alkyl group, mention may be made of a halogen atom, a hydroxyl group, an alkoxy group, and the like. $R_1$ and $R_2$ each are preferably hydrogen or an unsubstituted alkyl group of 1–4 carbon atoms. In the above formula (2), as the substituents in the phenyl group and the alkyl group, mention may be made of a halogen atom, a hydroxyl group, an alkoxy group, and the like. X of N—X is preferably hydrogen, a hydroxyl group or an unsubstituted phenyl group, and R' is preferably an unsubstituted alkyl group of 1–4 carbon atoms.

The salicyl derivatives are preferably salicyl alcohol and salicylamine. The salicylidene derivatives are preferably salicylaldehyde, salicylideneacetone, salicylaldimine, salicylideneaniline, and salicylaldoxime. Any of these salicyl and salicylidene derivatives can be used. Especially preferred are salicyl alcohol because it polymerizes at a high temperature of 100° C. or higher, and, hence, can safely stop the functions as batteries in the case of anomalous heat generation of batteries or abnormal high temperature of environment where they are used, and salicylaldehyde can also be preferably used because it has an additional function to complement by forming a chelate with metal ions when metal ions dissolve out. The amount thereof is preferably 0.1–25% by weight based on 100 parts by weight of the non-aqueous electrolyte exclusive of the salicyl derivative or the salicylidene derivative.

As the solvents, mention may be made of, for example, cyclic carbonate esters such as propylene carbonate (PC), ethylene carbonate (EC) and vinylene carbonate (VC), chain carbonate esters such as diethyl carbonate (DEC), dimethyl carbonate (DMC) and ethylmethyl carbonate (EMC), cyclic carboxylate esters such as γ-butyrolactone (GBL) and γ-valerolactone (GVL), chain ethers such as dimethoxymethane (DMM) and 1,3-dimethoxypropane (DMP), and cyclic esters such as tetrahydrofuran (THF) and 1,3-dioxolan (DOL). One or more of them can be used in combination with the salicyl derivatives or salicylidene derivatives. Preferably, the salicyl derivative or the salicylidene derivative is contained in a mixed solvent of the cyclic carbonate ester and the chain carbonate ester.

The lithium salts dissolved in these solvents include, for example, $LiClO_4$, $LiBF_4$, $LiPF_6$, $LiAlCl_4$, $LiSbF_6$, LiSCN, $LiCF_3SO_3$, $LiCF_3CO_2$, $Li(CF_3SO_2)_2$, $LiAsF_6$, $LiB_{10}Cl_{10}$, lower aliphatic lithium carbonates, LiCl, LiBr, LiI, borates such as chloroborane lithium, lithium bis(1,2-benzenedioleate(2-)—O,O')borate, lithium bis(2,3-naphthalenedioleate(2-)—O,O')borate, lithium bis(2,2'-biphenyldioleate(2-)—O,O')borate and lithium bis(5-fluoro-2-oleate-1-benzenesulfone-O,O')borate, and imide salts such as lithium bistetrafluoromethanesulfonimide $((CF_3SO_2)_2NLi)$, lithium tetrafluoromethanesulfonic acid nonafluorobutanesulfonimide $(LiN(CF_3SO_2)(C_4F_9SO_2))$ and lithium bispentafluoroethanesulfonimide $((C_2F_5SO_2)_2NLi)$. These may be used each alone or in combination of two or more. Among them, the organic acid anion type lithium salts are superior in heat stability to inorganic acid anion type lithium salts such as lithium perchlorate and lithium phosphofluoride, and these supporting electrolytes do not undergo heat decomposition during the use at high temperatures or the storage at high temperatures and do not cause deterioration of characteristics of batteries. Thus, they are preferred.

Lithium bistetrafluoromethanesulfonimide $((CF_3SO_2)_2NLi)$ shows a withstand voltage of 0 V against reductive decomposition and 4.7 V against oxidative decomposition on a platinum electrode in respect to a lithium reference electrode, lithium bispentafluoroethanesulfonimide $((C_2F_5SO_2)_2NLi)$ shows a withstand voltage of 0 V against reductive decomposition and 4.7 V against oxidative decomposition on a platinum electrode, lithium bis(5-fluoro-2-oleate-1-benzenesulfone-O,O')borate shows a withstand voltage of 0 V against reductive decomposition and 4.5 V against oxidative decomposition on a platinum electrode, and lithium bis(2,2'-biphenyldioleate(2-)—O,O')borate shows a withstand voltage of 0 V against reductive decomposition and 4.1 V or higher against oxidative decomposition on a platinum electrode. Therefore, these organic acid anion lithium salts are preferred for increasing energy density of lithium secondary batteries when they are used in non-aqueous electrolyte secondary batteries which use positive electrode active materials generating a high voltage of 4 V or higher in respect to lithium reference electrode, such as lithium cobaltate ($LiCoO_2$), lithium nickelate ($LiNiO_2$), and lithium manganate ($LiMn_2O_4$).

On the other hand, lithium bis(1,2-benzenedioleate(2-)—O,O')borate shows a withstand voltage of 0 V against reductive decomposition and 3.6 V against oxidative decomposition on a platinum electrode, and lithium bis(2,3-naphthalenedioleate(2-)—O,O')borate shows a withstand voltage 0 V against reductive decomposition and 3.8 V against oxidative decomposition on a platinum electrode. Therefore, these organic acid anion lithium salts can be used in non-aqueous electrolyte secondary batteries which use, as positive electrode active materials, transition metal sulfides which show an electromotive force of about 3 V in respect to lithium reference electrode, such as lithium titanium disulfide ($LiTiS_2$) and lithium molybdenum disulfide ($LiMoS_2$).

In the present invention, amount of the electrolyte contained in the battery is not limited, and it can be used in a necessary amount depending on the amount of positive electrode material and that of negative electrode material and the size of the battery. Amount of the supporting electrode dissolved in the non-aqueous solvent is not limited, but is preferably 0.2–2 mol/l, especially preferably 0.5–1.5 mol/l.

Moreover, for the purpose of improving discharge characteristics or charge and discharge characteristics, it is effective to add other compounds to the electrolyte. Examples of these other compounds are triethyl phosphite, triethanolamine, cyclic ethers, ethylenediamine, n-glyme, pyridine, hexaphosphoric acid triamide, nitrobenzene derivatives, crown ethers, quaternary ammonium salts, and ethylene glycol dialkyl ethers.

The positive electrode and negative electrode used in the present invention are those prepared by coating on the surface of a collector an active material layer comprising a positive electrode active material or a negative electrode material capable of electrochemically and reversibly absorbing and releasing lithium ions, a conductive agent, a binder and the like.

The negative electrode material used in the present invention is constructed using metallic lithium and a material capable of doping and dedoping lithium. As the material capable of doping and dedoping lithium, mention may be made of, for example, pyrolytic carbons, cokes (pitch cokes, needle cokes, petroleum cokes), graphite, glassy carbons, organic polymer compound fired products (those obtained by firing phenolic resin, furan resin or the like at a suitable temperature to carbonize the resin), carbon materials such as carbon fibers and active carbon, polymers such as polyacetylene, polypyrrole and polyacene, lithium-containing transition metal oxides or transition metal sulfides such as $Li_{4/3}Ti_{5/3}O_4$, $TiS_2$, etc., metals capable of alloying with alkali metals, such as aluminum, lead, tin, bismuth, silicon, etc., cubic system intermetallic compounds in which alkali metals are inserted into lattice (AlSb, $Mg_2Si$, $NiSi_2$), lithium nitrogen compounds ($Li_{(3-x)}M_xN$ (M: transition metal), etc. Especially, when graphite is used, the energy density of batteries is improved. These negative electrode materials may be used in admixture.

The conductive agents for negative electrodes used in the present invention may be any conductive agents as far as they are electron conductive materials. Examples thereof are graphites such as natural graphite (flaky graphite, etc.), manufactured graphite, etc., carbon blacks such as acetylene black, Ketzen black, channel black, furnace black, lamp black, thermal black, etc., conductive fibers such as carbon fibers, metallic fibers, etc., metal powders such as carbon fluoride, copper, nickel, etc., and organic conductive materials such as polyphenylene derivatives. These may be used each alone or in admixture of two or more. Of these conductive agents, manufactured graphite, acetylene black and carbon fibers are especially preferred. Amount of the conductive agents is not limited, but is preferably 1–50% by weight, particularly preferably 1–30% by weight. Since the negative electrode materials of the present invention per se have electron conductivity, the conductive agent may not be used for performing functions as the batteries.

The binders for negative electrodes used in the present invention may be any of thermoplastic resins or thermosetting resins. Preferred in the present invention are, for example, polyethylene, polypropylene, polytetrafluoroethylene (PTFE), polyvinylidene fluoride (PVDF), styrene-butadiene rubber, tetrafluoroethylene-hexafluoropropylene copolymer, tetrafluoroethylene-perfluoroalkylvinyl ether copolymer, vinylidene fluoride-hexafluoropropylene copolymer, vinylidene fluoride-chlorotrifluoroethylene copolymer, ethylenetetrafluoroethylene copolymer, polychlorotrifluoroethylene, vinylidene fluoride-pentafluoropropylene copolymer, propylene-tetrafluoroethylene copolymer, ethylene-chlorotrifluoroethylene copolymer, vinylidene fluoride-hexafluoropropylene-tetrafluoroethylene copolymer, vinylidene fluoride-perfluoromethylvinyl ether-tetrafluoroethylene copolymer, ethylene-acrylic acid copolymer or ($Na^+$) ion crosslinked product thereof, ethylene-methacrylic acid copolymer or ($Na^+$) ion crosslinked product thereof, ethylene-methyl acrylate copolymer or ($Na^+$) ion crosslinked product thereof, ethylene-methyl methacrylate copolymer or ($Na^+$) ion crosslinked product thereof, etc. These may be used each alone or in admixture. Of these materials, more preferred are styrene-butadiene rubber, polyvinylidene fluoride, ethylene-acrylic acid copolymer or ($Na^+$) ion crosslinked product thereof, ethylene-methacrylic acid copolymer or ($Na^+$) ion crosslinked product thereof, ethylene-methyl acrylate copolymer or ($Na^+$) ion crosslinked product thereof, and ethylene-methyl methacrylate copolymer or ($Na^+$) ion crosslinked product thereof.

The collectors for negative electrodes used in the present invention may be any collectors as far as they are electron conductors which undergo no chemical change in the fabricated batteries. For example, as materials therefor, there may be used stainless steel, nickel, copper, titanium, carbon, conductive resins, and, in addition, copper or stainless steel the surface of which is treated with carbon, nickel or titanium. Especially preferred are copper or copper alloys. The surface of these materials may be oxidized and used. Desirably, the surface of the collectors is made irregular by surface treatment. As for the shape of the collectors, there may be used foils, and, besides, films, sheets, nets, punched materials, lathes, porous materials, foamed materials, molded articles of fibers. Thickness is not limited, but is generally 1–500 μm.

As the positive electrode materials in the present invention, there may be used compounds containing or not containing lithium. Examples thereof are $Li_xCoO_2$, $Li_xNiO_2$, $Li_xMnO_2$, $Li_xCo_yNi_{1-y}O_2$, $Li_xNi_{1-y}M_yO_2$, $Li_xMn_2O_4$, $Li_xMn_{2-y}M_yO_4$ (M=at least one of Na, Mg, Sc, Y, Mn, Fe, Co, Ni, Cu, Zn, Al, Cr, Pb, Sb and B) (where x=0–1.2, y=0–0.9, z=2.0–2.3). The above value x is one before starting of charging and discharging, and increases or decreases by charging and discharging. Further, there may also be used other positive electrode active materials such as transition metal chalcogenides, vanadium oxides and lithium compounds thereof, niobium oxides and lithium compounds thereof, conjugated polymers using organic conductive materials, Chevrel phase compounds, etc. A plurality of different positive electrode active materials may be used in admixture. Average particle diameter of the positive electrode active material particles is not limited, but is preferably 1–30 μm.

The conductive agents for positive electrode used in the present invention may be any ones as far as they do not undergo chemical change at the charge and discharge potentials of the positive electrodes used. Examples thereof are graphites such as natural graphite (flaky graphite, etc.), manufactured graphite, etc., carbon blacks such as acetylene black, Ketzen black, channel black, furnace black, lamp black, thermal black, etc., conductive fibers such as carbon fibers, metallic fibers, etc., metal powders such as carbon fluoride, copper, nickel, aluminum, silver, etc., conductive whiskers such as zinc oxide, potassium titanate, etc. conductive metal oxides such as titanium oxide, etc. and organic conductive materials such as polyphenylene derivatives. These may be used each alone or in admixture of two or more. Of these conductive agents, manufactured graphite, acetylene black and nickel powders are especially preferred. Amount of the conductive agents is not limited, but is preferably 1–50% by weight, particularly preferably 1–30% by weight. Carbon and graphite are preferably in an amount of 2–15% by weight.

The binders for positive electrodes used in the present invention may be any of thermoplastic resins or thermosetting resins. Preferred in the present invention are, for example, polyethylene, polypropylene, polytetrafluoroethylene, polyvinylidene fluoride, tetrafluoroethylene-hexafluoroethylene copolymer, tetrafluoroethylene-hexafluoropropylene copolymer, tetrafluoroethylene-perfluoroalkylvinyl ether copolymer, vinylidene fluoride-hexafluoropropylene copolymer, vinylidene fluoride-chlorotrifluoroethylene copolymer, ethylene-tetrafluoroethylene copolymer, polychlorotrifluoroethylene, vinylidene fluoride-pentafluoropropylene copolymer, propylene-tetrafluoroethylene copolymer, ethylene-chlorotrifluoroethylene copolymer, vinylidene fluoride-hexafluoropropylene-tetrafluoroethylene copolymer, vinylidene fluoride-perfluoromethylvinyl ether-tetrafluoroethylene copolymer, ethylene-acrylic acid copolymer or ($Na^+$) ion crosslinked product thereof, ethylene-methacrylic acid copolymer or ($Na^+$) ion crosslinked product thereof, ethylene-methyl acrylate copolymer or ($Na^+$) ion crosslinked product thereof, ethylene-methyl methacrylate copolymer or ($Na^+$) ion crosslinked product thereof, etc. Of these materials, most preferred are polyvinylidene fluoride and polytetrafluoroethylene.

The collectors for positive electrodes used in the present invention may be any collectors as far as they are electron conductors which do not undergo chemical change at the charge and discharge potentials of the positive electrode materials. For example, as materials therefor, there may be used stainless steel, aluminum, titanium, carbon, conductive resins, and, in addition, aluminum or stainless steel the surface of which is treated with carbon-or titanium. Especially preferred are aluminum or aluminum alloys. The surface of these materials may be oxidized and used. Desirably, the surface of the collectors is made irregular by surface treatment. As for the shape of the collectors, there may be used foils, and, besides, films, sheets, nets, punched materials, lathes, porous materials, foamed materials, molded products of fibers or nonwoven fabrics. Thickness is not limited, but is generally 1–500 μm.

In an active material layer, there may be added a conductive agent and a binder, and, in addition, a filler, a dispersing agent, an ion conducting agent, a pressure increasing agent and other various additives. The fillers may be any fibrous materials which do not undergo chemical change in a fabricated battery, and ordinarily fibers such as of olefin polymers, for example, polypropylene and polyethylene, glass and carbon are used. The amount of fillers is not limited, but is preferably 0–30% by weight.

The construction of the negative electrode plate and the positive electrode plate in the present invention is preferably such that at least the surface of the active material layer of the positive electrode faces the surface of the active material layer of the negative electrode.

As the separator in the present invention, an insulating microporous thin film having a great ion permeability and a given mechanical strength can be used. The separator preferably has a function of closing the pores at a temperature higher than a given temperature to enhance the resistance. Examples are sheets, nonwoven fabrics or woven fabrics made from olefin polymers of one or combination of polypropylene and polyethylene or glass fibers from the points of organic solvent resistance and hydrophobic properties. Pore diameter of the separator is preferably in the range where active materials of positive and negative electrodes, binders and conductive agents which are released from the electrode sheets do not permeate through the separator. The pore diameter is preferably 0.01–1 μm. Thickness of the separator is generally 10–300 μm. The porosity is determined depending on permeability to electron or ion, materials or film thickness, and is generally 30–80%.

Moreover, it is also possible to construct a battery in the following manner. That is, an organic electrolyte comprising a solvent and a lithium salt dissolving in the solvent is absorbed and held in a polymer material and this is contained in the active material layer of positive electrode and that of negative electrode, and, furthermore, a porous separator comprising a polymer capable of absorbing and holding the organic electrolyte is integrated with the positive electrode and the negative electrode. The above polymer material may be one which can absorb and hold the organic electrolyte, and is especially preferably a copolymer of vinylidene fluoride and hexafluoropropylene.

The shape of batteries may be any of coin type, button type, sheet type, laminate type, cylindrical type, flat type, rectangular type and large-sized type to be used for electric cars.

Furthermore, the non-aqueous electrolyte secondary batteries of the present invention can be used for portable information terminals, portable electronic equipment, domestic small-sized power storage devices, automatic two-wheeled vehicles, electric cars, hybrid electric cars, etc. These are not limiting.

The present invention may also be a sub-combination of these described features.

EXAMPLES

The present invention will be explained in more detail by the following examples. These examples should not be construed as limiting the invention in any manner.

EXAMPLE 1

FIG. 1 is a longitudinal sectional view of a cylindrical battery of the present invention. A positive electrode plate 5 and a negative electrode plate 6, and a separator 7 between the electrode plates are wound a plurality of times into a spiral form and are contained in a battery case 1. A positive electrode lead 5a is drawn from the positive electrode plate 5 and connected to a sealing plate 2, and a negative electrode lead 6a is drawn from the negative electrode plate 6 and connected to the bottom of the battery case 1. The battery case or lead plate may be made of a metal or metal alloy having organic electrolyte resistance and electron conductivity. For example, there may be used metals such as iron, nickel, titanium, chromium, molybdenum, copper, aluminum, etc. and alloys of these metals. Especially, a stainless steel plate or Al—Mn alloy plate which is worked is most preferred for the battery case, aluminum is most preferred for the positive electrode lead, and nickel is most preferred for the negative electrode lead. For the purpose of weight-saving, various engineering plastics and combination of these plastics with metals can also be used. The numeral 8 indicates insulating rings, which are provided at the upper part and the lower part of plate group 4, respectively. An electrolyte is poured thereinto and a battery can is formed using a sealing plate. In this case, a safety valve can be used as the sealing plate. In addition to the safety valve, there may be provided various known safety elements. For example, fuse, bimetal, PTC element, etc. are used as over-current prevention elements. Furthermore, in addition to the use of safety valve, a method of providing a notch for the battery case, a method of providing a crack for gasket, a method of providing a crack for the sealing plate, a method of cutting from the lead plate, etc. can be utilized for the inhibition of rising of internal pressure of the battery case. Moreover, a protective circuit containing measures against a overcharging or overdischarging may be provided in a charging device or may be independently connected to the battery case. In addition, a system for cut-off of current due to rising of internal pressure may also be provided as a measure against overcharging. In this case, a compound which raises internal pressure can be contained in the active layer or the electrolyte. Examples of the compound raising the internal pressure are carbonates such as $Li_2CO_3$, $LiHCO_3$, $Na_2CO_3$, $NaHCO_3$, $CaCO_3$, and $MgCO_3$. Cap, battery case, sheet and lead plate can be welded by known methods (e.g., DC or AC electric welding, laser welding, ultrasonic welding). As the sealing agents, there may be used known compounds or mixtures such as asphalt.

The negative electrode 6 was made by mixing 75% by weight of a manufactured graphite powder, 20% by weight of a carbon powder as a conductive agent, and 5% by weight of a polyvinylidene fluoride resin as a binder, dispersing the mixture in dehydrated N-methylpyrrolidinone to prepare a slurry, coating the slurry on a negative electrode collector comprising a copper foil, drying the coat and rolling the coated foil.

On the other hand, the positive electrode 5 was made by mixing 85% by weight of a lithium cobaltate powder, 10% by weight of a carbon powder as a conductive agent, and 5% by weight of a polyvinylidene fluoride resin as a binder, dispersing the mixture in dehydrated N-methylpyrrolidinone to prepare a slurry, coating the slurry on a positive electrode collector comprising an aluminum foil, drying the coat and rolling the coated foil.

The plate group made in this way was put in a battery case and a non-aqueous electrolyte as shown in Table 1 (EC=ethyl carbonate, EMC=ethylmethyl carbonate, DEC=diethyl carbonate, GBL=γ-butyrolactone) was poured into the case to make a battery. The amounts of the salicyl derivative and the salicylidene derivative are % by weight based on the weight (100) of the non-aqueous electrolyte exclusive of the derivatives. The cylindrical battery made had a diameter of 18 mm and a height of 65 mm.

The thus obtained batteries were repeatedly subjected to a charge and discharge cycle comprising a charging to reach 4.2 V at a constant current of 1120 mA and a discharging to reach 2.0 V at a constant current of 1120 mA. The charging and discharging cycle was repeated 200 times (200 cycles). The initial discharge capacity and the discharge capacity at 200th cycle are shown in Table 2. Furthermore, the same batteries were charged to reach 4.2 V at a constant current of 1120 mA and once discharged to reach 2.0 V, and after the initial battery capacity was checked, they were again charged to reach 4.2 V and stored at 60° C. for 20 days. The discharge capacity of the batteries after stored, and amount of gas collected in a liquid paraffin from a hole made at the batteries after stored are shown in Table 2.

TABLE 1

| | Composition of electrolyte (volume ratio) | Additive | Amount of additive (wt %) |
|---|---|---|---|
| Battery 1 | EC/EMC = 1/1 + 1.0M $LiPF_6$ | Salicyl alcohol | 0.02 |
| Battery 2 | EC/EMC = 1/1 + 1.0M $LiPF_6$ | Salicyl alcohol | 0.05 |
| Battery 3 | EC/EMC = 1/1 + 1.0M $LiPF_6$ | Salicyl alcohol | 0.1 |
| Battery 4 | EC/EMC = 1/1 + 1.0M $LiPF_6$ | Salicyl alcohol | 5 |
| Battery 5 | EC/EMC = 1/1 + 1.0M $LiPF_6$ | Salicyl alcohol | 10 |
| Battery 6 | EC/EMC = 1/1 + 1.0M $LiPF_6$ | Salicyl alcohol | 20 |
| Battery 7 | EC/EMC = 1/1 + 1.0M $LiPF_6$ | Salicyl alcohol | 25 |
| Battery 8 | EC/EMC = 1/1 + 1.0M $LiPF_6$ | Salicyl alcohol | 30 |
| Battery 9 | EC/EMC = 1/1 + 1.0M $LiPF_6$ | Salicylaldehyde | 0.02 |
| Battery 10 | EC/EMC = 1/1 + 1.0M $LiPF_6$ | Salicylaldehyde | 0.05 |
| Battery 11 | EC/EMC = 1/1 + 1.0M $LiPF_6$ | Salicylaldehyde | 0.1 |
| Battery 12 | EC/EMC = 1/1 + 1.0M $LiPF_6$ | Salicylaldehyde | 5 |
| Battery 13 | EC/EMC = 1/1 + 1.0M $LiPF_6$ | Salicylaldehyde | 10 |
| Battery 14 | EC/EMC = 1/1 + 1.0M $LiPF_6$ | Salicylaldehyde | 20 |
| Battery 15 | EC/EMC = 1/1 + 1.0M $LiPF_6$ | Salicylaldehyde | 25 |
| Battery 16 | EC/EMC = 1/1 + 1.0M $LiPF_6$ | Salicylaldehyde | 30 |
| Battery 17 | EC/EMC = 1/1 + 1.0M $LiPF_6$ | No | 0 |
| Battery 18 | EC/GBL = 1/1 + 1.0M $LiPF_6$ | Salicyl alcohol | 10 |
| Battery 19 | GBL + 1.0M $LiPF_6$ | Salicyl alcohol | 10 |

TABLE 2

| | Initial capacity/ mAh | Capacity at 200th cycle/ mAh | Capacity after storage/ mAh | Amount of gas after storage/ ml |
|---|---|---|---|---|
| Battery 1 | 1550 | 1386 | 1316 | 8.2 |
| Battery 2 | 1548 | 1487 | 1503 | 1.2 |
| Battery 3 | 1562 | 1503 | 1511 | 0.4 |
| Battery 4 | 1558 | 1508 | 1510 | 0.8 |
| Battery 5 | 1573 | 1533 | 1550 | 0.7 |
| Battery 6 | 1563 | 1510 | 1499 | 0.5 |
| Battery 7 | 1578 | 1531 | 1544 | 0.6 |
| Battery 8 | 1577 | 1234 | 1125 | 0.7 |
| Battery 9 | 1593 | 1379 | 1325 | 7.9 |
| Battery 10 | 1569 | 1446 | 1521 | 1.1 |
| Battery 11 | 1573 | 1506 | 1529 | 0.3 |
| Battery 12 | 1588 | 1518 | 1528 | 0.4 |
| Battery 13 | 1577 | 1522 | 1531 | 0.3 |
| Battery 14 | 1564 | 1506 | 1500 | 0.5 |
| Battery 15 | 1584 | 1532 | 1533 | 0.8 |
| Battery 16 | 1520 | 1198 | 1095 | 0.8 |
| Battery 17 | 1584 | 1350 | 1305 | 8.3 |
| Battery 18 | 1569 | 1524 | 1543 | 0.6 |
| Battery 19 | 1565 | 1509 | 1529 | 0.6 |

As shown in Table 2, it is clear that according to the present invention, there can be obtained lithium secondary batteries which hardly evolve gases, are excellent in cycle life and storage characteristics at high temperatures and are high in reliability.

In this example, explanation was made of lithium cobaltate as the positive electrode material, but it is clear that the similar effects can also be obtained using other transition metal oxides such as lithium nickelate and lithium manganate or transition metal sulfides such as titanium disulfide and molybdenum disulfide, and the invention is not limited to this example. Furthermore, in this example, the negative electrode material was explained using manufactured graphite, but it is clear that the similar effects can also be obtained using metallic lithium, lithium alloys and lithium compounds and carbon materials capable of absorbing and releasing lithium other than the manufactured graphite. Thus, the invention is not limited to this example.

Furthermore, the method of making the electrodes does not affect the essence of the present invention, and the invention is not limited to this example.

Moreover, combination and mixing ratio of the electrolytes and amounts of the supporting electrolytes employed in this example are not determined without variation, but optional combinations, mixing ratios and amounts can be employed and the similar effects can also be obtained. Therefore, the electrolytes are not limited to the combinations, the mixing ratios and amounts employed in this example, and these can be optionally set for one skilled in the art. However, as for the supporting electrolytes, the kind thereof must be selected depending on the positive electrode material used from the point of their oxidation voltage resistance, but this can be optionally set for one skilled in the art.

As explained above, according to the present invention, ester interchange reaction hardly takes place, namely, alkoxide radicals which are strong nucleophilic reagents are hardly produced, and chemical stability of the non-aqueous electrolytes is enhanced, and, as a result, evolution of gas during charging and storage at high temperatures and deterioration of characteristics caused by dissolution of metals in active materials, particularly, positive electrode materials can be inhibited. Thus, there are obtained novel non-aqueous electrochemical apparatuses, namely, non-aqueous electrolyte secondary batteries which can be used in a wide temperature range, are high in energy density, less in deterioration of discharge capacity caused by repeated use of the batteries, and are excellent in high rate charge and discharge characteristics.

What is claimed is:

1. An electrolyte for non-aqueous electrochemical apparatuses consisting essentially of (i) a non-aqueous solvent, (ii) a solute and (iii) at least one compound selected from the group consisting of a salicyl derivative represented by the formula (1) and a salicylidine derivative represented by the formula (2):

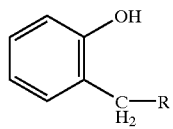

(1)

wherein R represents $C_nH_{2n}OH$ (in which n is an integer of 0–4) or $NR_1R_2$ (in which $R_1$ and $R_2$ are independently hydrogen or a substituted or unsubstituted alkyl group),

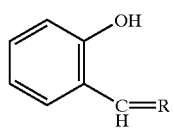

(2)

wherein R represents oxygen, N—X (in which X is hydrogen, a hydroxyl group or a substituted or unsubstituted phenyl group) or CHCOR' (in which R' is a substituted or unsubstituted alkyl group).

2. An electrolyte according to claim 1, wherein the salicyl derivative is salicyl alcohol and the salicylidene derivative is salicylaldehyde.

3. An electrolyte according to claim 1 which contains at least one of the salicyl derivative and the salicylidene derivative in an amount of 0.1–25 parts by weight based on 100 parts by weight of the non-aqueous electrolyte exclusive of the salicyl derivative and the salicylidene derivative.

4. A non-aqueous electrochemical apparatus comprising at least two electrodes, a separator interposed between the two electrodes and a non-aqueous electrolyte consisting essentially of a non-aqueous solvent and a solute dissolved in the solvent, said non-aqueous electrolyte comprising at least one compound selected from the group consisting of a salicyl derivative represented by the formula (1) and a salicylidene derivative represented by the formula (2):

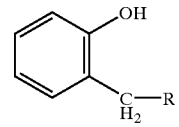

(1)

wherein R represents $C_nH_{2n}OH$ (in which n is an integer of 0–4) or $NR_1R_2$ (in which $R_1$ and $R_2$ are independently hydrogen or a substituted or unsubstituted alkyl group),

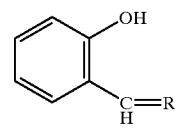

(2)

where R represents oxygen, N—X (in which X is hydrogen, a hydroxyl group or a substituted or unsubstituted phenyl group) or CHCOR' (in which R' is a substituted or unsubstituted alkyl group).

5. A non-aqueous electrochemical apparatus according to claim 4, wherein the salicyl derivative is salicyl alcohol and the salicylidene derivative is salicylaldehyde.

6. A non-aqueous electrochemical apparatus according to claim 4, wherein the non-aqueous electrolyte contains at least one of the salicyl derivative and the salicylidene derivative in an amount of 0.1–25 parts by weight based on 100 parts by weight of the non-aqueous electrolyte exclusive of the salicyl derivative and the salicylidene derivative.

7. A non-aqueous electrochemical apparatus comprising at least two electrodes, a separator interposed between the two electrodes and a non-aqueous electrolyte comprising a non-aqueous solvent and a solute dissolved in the solvent, said non-aqueous electrolyte comprising at least one compound selected from the group consisting of a salicyl derivative represented by the formula (1) and a salicylidene derivative represented by the formula (2):

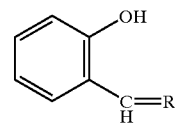

(2)

wherein R represents $C_nH_{2n}OH$ (in which n is an integer of 0–4) or $NR_1R_2$ (in which $R_1$ and $R_2$ are independently hydrogen or a substituted or unsubstituted alkyl group),

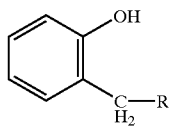

(1)

where R represents oxygen, N—X (in which X is hydrogen, a hydroxyl group or a substituted or unsubstituted phenyl group) or CHCOR' (in which R' is a substituted or unsubstituted alkyl group), wherein the non-aqueous solvent contains a mixed solvent of a cyclic carbonate ester and a chain carbonate ester.

8. A non-aqueous electrochemical apparatus comprising at least two electrodes, a separator interposed between the two electrodes and a non-aqueous electrolyte comprising a non-aqueous solvent and a solute dissolved in the solvent, said non-aqueous electrolyte comprising at least one compound selected from the group consisting of a salicyl derivative represented by the formula (1) and a salicylidene derivative represented by the formula (2):

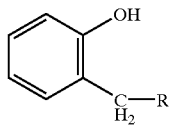

(1)

wherein R represents $C_nH_{2n}OH$ (in which n is an integer of 0–4) or $NR_1R_2$ (in which $R_1$ and $R_2$ are independently hydrogen or a substituted or unsubstituted alkyl group),

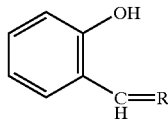

(2)

where R represents oxygen, N—X (in which X is hydrogen, a hydroxyl group or a substituted or unsubstituted phenyl group) or CHCOR' (in which R' is a substituted or unsubstituted alkyl group), wherein the non-aqueous solvent contains γ-butyrolactone.

9. A non-aqueous electrochemical apparatus comprising at least two electrodes, a separator interposed between the two electrodes and a non-aqueous electrolyte comprising a non-aqueous solvent and a solute dissolved in the solvent, said non-aqueous electrolyte comprising at least one compound selected from the group consisting of a salicyl derivative represented by the formula (1) and a salicylidene derivative represented by the formula (2):

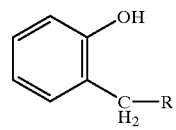

(1)

wherein R represents $C_nH_{2n}OH$ (in which n is an integer of 0–4) or $NR_1R_2$ (in which $R_1$ and $R_2$ are independently hydrogen or a substituted or unsubstituted alkyl group),

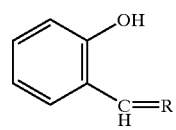

(2)

where R represents oxygen, N—X (in which X is hydrogen, a hydroxyl group or a substituted or unsubstituted phenyl group) or CHCOR' (in which R' is a substituted or unsubstituted alkyl group), wherein the solute is an imide salt or a boric acid salt.

* * * * *